Dec. 12, 1944. C. E. MONGAN, JR 2,365,138
METHOD OF AND APPARATUS FOR TEMPERING HOLLOW GLASS ARTICLES
Filed Feb. 27, 1942 2 Sheets-Sheet 1

Witness:
A. A. Horn

Inventor:
Charles E. Mongan, Jr.
by Brown & Parham
Attorneys.

Dec. 12, 1944.  C. E. MONGAN, JR  2,365,138
METHOD OF AND APPARATUS FOR TEMPERING HOLLOW GLASS ARTICLES
Filed Feb. 27, 1942  2 Sheets-Sheet 2
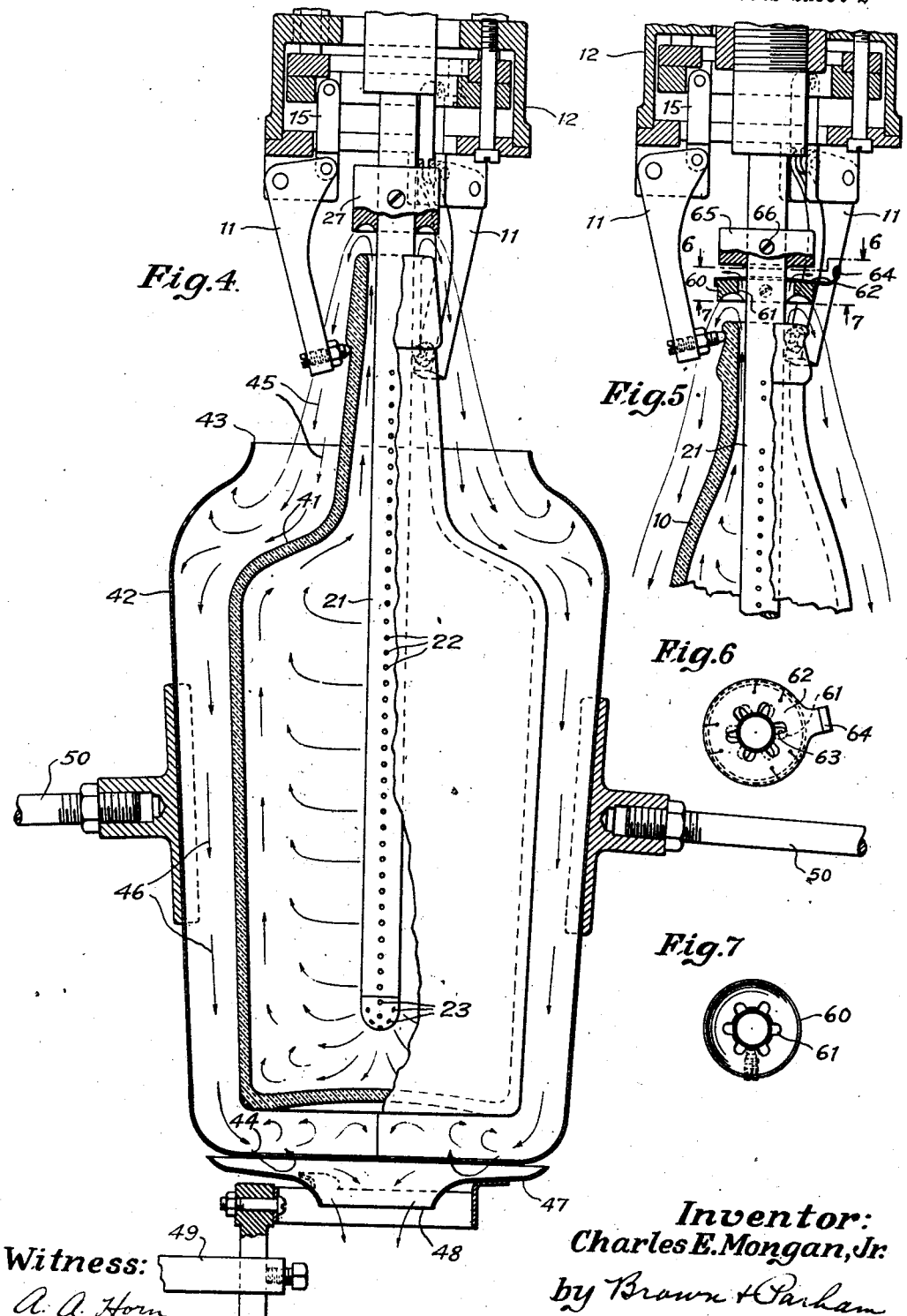
Witness:
A. A. Horn
Inventor:
Charles E. Mongan, Jr.
by Brown & Parham
Attorneys.

Patented Dec. 12, 1944

2,365,138

UNITED STATES PATENT OFFICE 2,365,138

METHOD OF AND APPARATUS FOR TEMPERING HOLLOW GLASS ARTICLES

Charles E. Mongan, Jr., Hartford, Conn., assignor to Hartford-Empire Company, Hartford, Conn., a corporation of Delaware Application February 27, 1942, Serial No. 432,584

13 Claims. (Cl. 49—45)

This invention relates to the tempering of hollow glass articles, such as bottles, jars and other glass containers.

A glass article is tempered by cooling it abruptly from a temperature sufficiently above (as near its softening point) to a temperature below the strain point of the glass of such article so as to cause permanent stresses in the form of compression of the surface layers and tension of inner layers of the walls of such article.

The present invention relates more particularly to that branch of the glass tempering art which includes proposals involving the use of gaseous fluid, blown or otherwise applied to the glass article to be tempered, for the purpose of causing rapid cooling of the article to effect tempering thereof. The term "gaseous fluid" as used in this specification and in the appended claims may refer to air, any other suitable known gas, steam, or any suitable known mixture of air or gas and water, oil or other liquid.

Prior proposals for applying gaseous fluid to a glass article to cool it rapidly through the tempering range have either assumed that tempering could be effected simply by circulating the cooling fluid through the interior of the article without any artificial cooling of the outer surface of such article or have provided one means for blowing gaseous fluid against the internal surface of the article and other means for blowing gaseous fluid against the external surface of the article. The proposals which contemplate forced or artificial cooling of only the internal surface of a hollow article, leaving the cooling of the walls of the article at its outer surface to be effected by radiation to the atmosphere, are unsuitable for tempering most, if not all bottles, jars and other hollow glass articles of commerce. When the cooling rates at the inner and outer surfaces of such an article are so widely different, as in the proposals just referred to, breakage of the article during the attempted tempering thereof is likely to occur. Even if such an article does not break during the tempering operation, it usually would not be tempered satisfactorily to meet the requirements of the service for which it was intended.

I have discovered that I can satisfactorily temper a hollow glass article, such as a bottle or jar, by circulating gaseous cooling fluid under pressure through the interior of the hollow glass article in such a way and by such means that the cooling fluid, after having the desired cooling effect at the inner surface of the article, is exhausted or permitted to escape from the article through the open end thereof and is then directed against the external surface of the article, which will be cooled thereby at a rate suitably related to the cooling rate of the inner surface of the article to produce compressive stresses in the outer surface layers of the glass walls of the article substantially like the compressive stresses in the corresponding portions of the inner surface layers of such walls. My discovery enables me to dispense with the use of external cooling fluid blowers or applicators in tempering bottles, jars and other hollow glass articles and at the same time to obtain coordinated artificial or forced cooling of the article at both its inner and outer surfaces adequate to set up the desired compressive stresses in the glass at such surfaces.

Objects of the present invention are to provide a practicable method of and effective, relatively simple means for carrying my aforesaid discovery into effect.

According to the present invention, a suitable cooling fluid under pressure, such as compressed air, may be introduced into the interior of the article to be tempered by a nozzle that is arranged to project into such article through the open end thereof. Such a nozzle may be sufficiently smaller in diameter at the open end or mouth of the article to leave an annular space around the nozzle at that place for the egress of the cooling fluid. A suitable means may be provided adjacent to the open end or mouth of the hollow glass article to intercept the gaseous fluid exhaust from the hollow glass article and to reverse the direction of movement thereof so that such exhaust will be directed longitudinally of the hollow article in heat extracting relation with the external surface thereof.

The exhaust fluid will have been heated during its passage through the interior of the hollow glass article to a temperature somewhat higher than that of the original cooling fluid. I have found that the resultant temperature differential between the cooling fluid as applied to the interior of the article and as subsequently applied to the exterior of the article is substantially balanced or compensated for by the difference between the natural conditions which respectively exist at the interior and the exterior of the article and which differentially affect the cooling rates at these places. In consequence, the same cooling fluid may be used to cool rapidly the inner surface and then the outer surface of the hollow article so as to produce generally similar compressive stresses at both these surfaces.

Other objects of the invention and further advantages thereof will hereinafter be pointed out or will become apparent from the following description of illustrative embodiments of the invention, as shown in the accompanying drawings, in which:

Fig. 4 is a view generally similar to Fig. 2 but showing apparatus of the invention as provided to effect rapid cooling of the internal and external surfaces of a bottle of a shape different from that of the bottle shown in Fig. 1;

Fig. 5 is a view of a modified form of apparatus suitable for use to carry out the method of the invention;

Fig. 6 is a section along the line 6—6 of Fig. 5; and

Fig. 7 is a section along the line 7—7 of Fig. 5.

Figure 1:
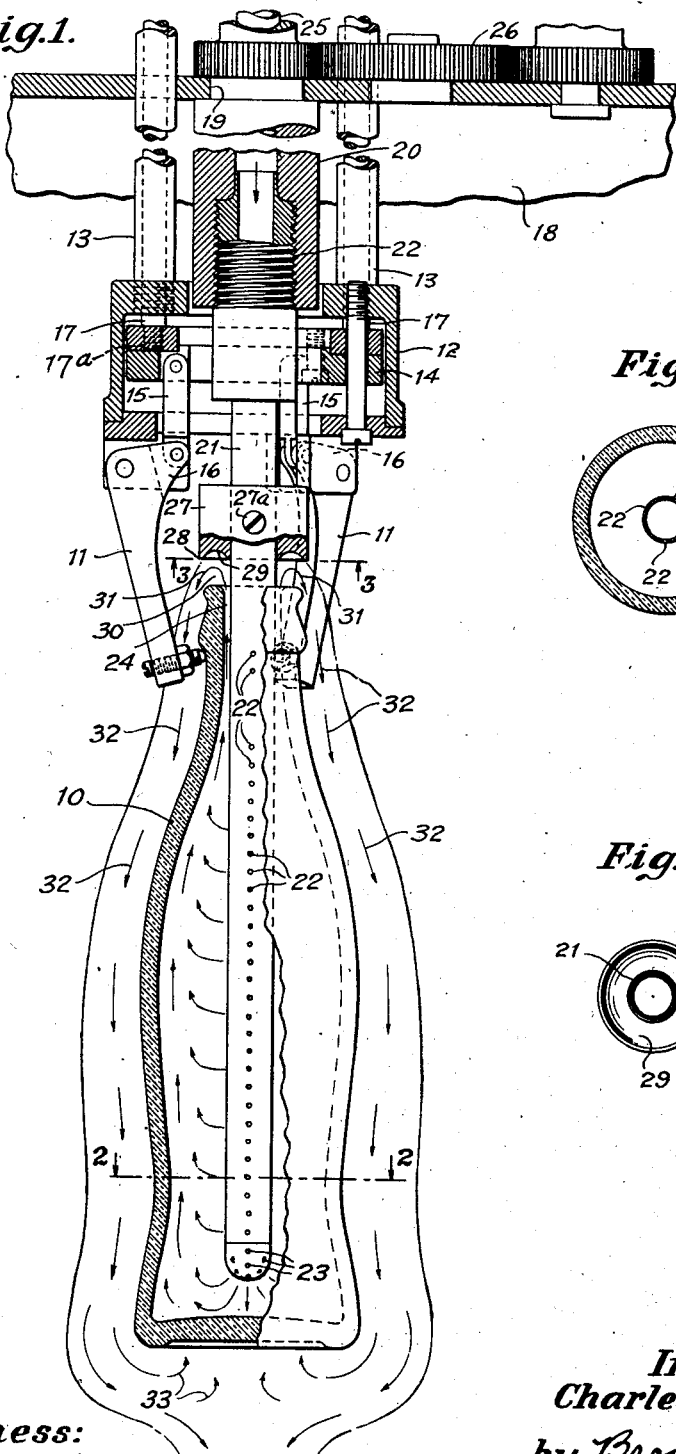
Figure 1 is a view, mainly in vertical section, showing apparatus of the invention as employed to effect cooling of both the internal and external surfaces of a bottle of a well known type.
Figure 2:
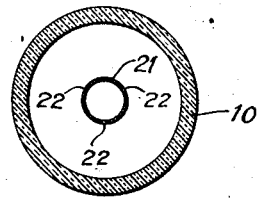
Fig. 2 is a section along the line 2—2 of Fig. 1.
Figure 3:
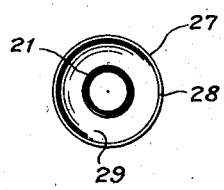
Fig. 3 is a section along the line 3—3 of Fig. 1.

As shown in Fig. 1, a bottle 10 of a well known type is suspended in an upright position by an article supporting mechanism which includes pivoted tong members 11 for gripping and releasably supporting such article. As shown, the tong members 11 are pivotally suspended from an annular head 12 which in turn is supported by vertically disposed tubular members 13. An actuating ring 14 is mounted for limited vertical movements within the confines of the head 12 and is connected by links 15 with knuckles 16 on the pivoted ends of the tong fingers 11 so that vertical movement of the actuating ring 14 in one direction will impart closing movements to the tong fingers 11 while vertical movement of the ring 14 in the opposite direction will open such fingers. These vertical movements of the ring 14 in the head 12 may be effected by vertically disposed push-and-pull rods 17 which depend through the tubular members 13 into the head 12, where they are connected with the actuating ring 14, as by having screw-threaded lower end portions screwed into suitable threaded openings in the upper part of the ring 14, as indicated at 17a for one of the rods 17 in Fig. 1.

A horizontally disposed main supporting member 18 is shown as having holes through which the tubular members 13 extend and another hole or vertical opening 19 which is located in co-axial alignment with the head 12. A tubular chuck 20 may be journaled in the opening 19 in the frame member 18 so as to depend into the annular member 12. A nozzle 21 is detachably connected with the chuck 20, as by screw threaded engagement therewith at 22, so that such nozzle depends between the tong members 11 through the open end of the suspended upright bottle 10 when the latter is supported by the tong members as shown in Fig. 1.

The nozzle 21 may be of sufficient length to extend downwardly within the bottle 10 nearly to the bottom of the latter and may be provided with one or more longitudinally extending rows of lateral jet holes through its side wall, as at 22, and other jet holes, as at 23, in its closed bottom wall. The number of the jet holes, the size or sizes and the locations thereof may all be predetermined to distribute the gaseous cooling fluid supplied by the nozzle to different parts of the internal surface of the bottle as may be deemed necessary or desirable to produce the desired compressive stresses throughout the internal surface layer of glass of the particular article that is undergoing the tempering treatment. Briefly, the nozzle selected may be that which is deemed to be best adapted to apply the gaseous coolant to the internal surface of the bottle to effect cooling of the different portions of such surface at the rate or rates deemed most suitable for the setting up of the desired compressive stresses in the internal surface layers of the bottle. Such nozzle, at the portion thereof extending through the open end portion of the bottle may be sufficiently smaller in diameter or cross-sectional area than the surrounding internal wall of that portion of the bottle to provide an exhaust passage between the nozzle and the bottle, as at 24 in Fig. 1.

The cooling gaseous fluid may be delivered to the interior of the nozzle 21 in any suitable known manner, as by means of a supply tube 25 extending into the hollow chuck 20 so as to communicate with the bore of the nozzle at the upper end of the latter.

The chuck and the nozzle may be rotated about the vertical axis of the nozzle, as by the train of gearing indicated at 26.

The structure that has been described so far does not, per se, form part of the present invention. Any suitable nozzle may be employed to blow the cooling gaseous fluid against the internal surface of the hollow glass article that is to be tempered and any suitable structure likewise may be employed to support operatively such nozzle and the bottle or other article to be tempered. The particular nozzle and article supporting structure shown in Fig. 1 and hereinbefore described in considerable detail constitute part of the tempering apparatus of the joint invention of myself and Donald W. Mueller, as disclosed in our joint application, Serial No. 454,248, filed August 10, 1942.

An annular exhaust intercepting and direction reversing member 27 may be provided as a structural feature of the invention. Such member which may fit slidably on the portion of the nozzle 21 above the open end of the bottle and be secured to the latter, as by a set screw 27a, at a predetermined adjustable distance from the mouth or open end of the bottle. The member 27 may have an outer diameter slightly greater than that of the adjacent open end or mouth portion of the bottle. A gaseous fluid directing lip 28 is provided at the lower end of the member 27 in confronting or opposing relation to the open end or mouth portion of the bottle. This deflecting lip 28 may be provided by cutting or otherwise forming an annular groove 29 in the lower end of the member 27. This groove may be arcuate in cross-sectional configuration at any radial plane. The arrangement is such that an annular passage 30 is provided around the nozzle between the concavely grooved bottom of the member 27 and the upper end or mouth of the bottle which, in the example shown, is convexly curved in cross-section at any radial plane.

The passage 30 will reverse the direction of movement of the gaseous fluid exhaust from the bottle, substantially as indicated by the arrows 31. Such gaseous exhaust will be directed by the lip 28 of the member 27 downwardly along the outer surface of the bottle 10 in good heat extracting relation therewith, as indicated by the arrows at 32. At the bottom of the bottle 10, gaseous fluid from the downwardly moving currents will swirl beneath the bottom of the article, substantially as indicated by the arrows 33, and will effect cooling of the external surface of the bottle bottom.

Rotation of the nozzle 21 about its own axis may be employed to distribute the cooling fluid discharge from the jet holes of the nozzle around the interior of the bottle. Such rotation also will aid in producing a uniform annular stream of exhaust gases moving through the exhaust passage 24 and through the direction reversing passage 31 and thus may aid in assuring that the exhaust from the bottle will be directed downwardly in an annular stream that completely surrounds and envelops the bottle so as to have a substantially uniform cooling action circumferentially of the bottle at any given plane. The exhaust fluid, on striking the groove in the bottom of the rotating member 27, will be given a rolling action which will aid in effecting the desirable distribution of the exhaust gases circumferentially of the bottle. It of course is to be understood that if the nozzle 21 is provided with jet holes spaced around the periphery thereof sufficiently for the desired distribution of the cooling fluid around the internal surface of the bottle, rotation of the nozzle or relative rotary movement between the nozzle and the article may be dispensed with and satisfactory cooling of the external surface of the bottle by downwardly directed exhaust gases still obtained.

In the illustrative embodiment of the invention just described, the member 27 acts to intercept the gaseous fluid exhaust from the bottle and to reverse the direction of movement of such fluid so as to direct an annular stream of the fluid downwardly along the external surface of the bottle without any positive downward propulsion of such fluid.

In Fig. 4, the article to be tempered, designated 40, has a neck portion merged into a relatively large body portion by an abrupt shoulder portion 41. To effect tempering of a bottle or article of this type of shape, an additional fluid directing means may be employed at the exterior of the bottle. As shown, a gaseous fluid directing member 42 surrounds the body portion of the bottle 40 in spaced relation with the outer wall of the latter. The member 52 is open at its top, as at 43, at a level above the shoulder 41, and may also be open at its bottom, as at 44, below the level of the bottle bottom.

The gaseous fluid exhaust from the interior of the bottle is directed downwardly at the outer surface of the neck portion of the article as indicated by the arrows 45, substantially as previously described. The abrupt shoulder 41 of the bottle would deflect the downwardly moving stream of gaseous fluid outwardly away from the body of the bottle unless such deflection were prevented. This is done by the surrounding member 42. The downwardly moving stream of fluid enters the member 42 above the level of the shoulder 41 and thence is directed downwardly by the member 42 in contact with the external surface of the body portion of the bottle, substantially as indicated by the arrows 46. On leaving the passageway between the member 42 and the body of the bottle 40 at the bottom of the latter, the downwardly moving gaseous fluid may be deflected upwardly against the bottom of the bottle by a separate bottom baffle or deflector 47. This may be of shallow dish-like form, being provided with a central opening in its bottom, as at 48, through which the gaseous fluid may pass after such fluid has scrubbed against the bottom of the bottle. The member 42 may be of suitable shape and size in relation to the shape and size of the enclosed portion of the bottle to be cooled to provide a passageway of substantially uniform width between itself and the bottle or to provide a passageway that is of sufficiently reduced width at a suitable level to serve somewhat as a Venturi passage.

The bottom deflector 47 may be movably supported by any suitable supporting and operating structure. As shown, it is carried by a support 49 which may be moved manually or by any other suitable known mechanical means. This bottom deflector may be used, if deemed necessary or desirable, without the surrounding deflector 42, as, for example, at the bottom of the bottle shown in Fig. 1.

The annular deflector 42 likewise may be of any suitable structure and may be positioned in its operative relationship with the bottle in any suitable way. Thus, it may consist of two half sections, each on a supporting arm or carrier 50, which may be moved manually or by any suitable known mechanical means to open and close the deflector 42.

In Fig. 5, the exhaust fluid intercepting and direction reversing member is indicated at 60 and is formed with a series of vertical openings 61 at its central portion, next to the nozzle, to permit part of the total volume of exhaust gases escaping from the interior of the bottle to escape to the atmosphere while the remaining exhaust gases are intercepted and directed downwardly against the outer surface of the bottle, as in the examples previously described. A register 62 may be mounted on the member 60 and provided with openings 63 corresponding with the openings 61. This register may be rotated on the member 60 around the axis of the nozzle, as by the handle 64, so that the openings 61 may be partially or completely closed or completely open at the will of the operator. An auxiliary deflector 65 may be fastened on the nozzle above the member 64 to deflect outwardly and away from the overhead supporting structure such portion of the exhaust fluid as is permitted to pass through the openings 61 of the direction reversing member 60. This member 65, like the member 60, may be fastened to the nozzle by a set screw, indicated at 66, so that its position along the nozzle may be adjusted.

The operation of the form of the device shown in Fig. 5 otherwise is similar to that of the previously described embodiments of the invention.

What I claim is:

1. The method of tempering a bottle, jar or other hollow glass article that is closed at one end and open at the opposite end thereof, which comprises directing gaseous chilling fluid under pressure against the inner surface of said article when the latter is at a suitable tempering temperature above its strain point and thence out of the article through the open end thereof rapidly to chill said inner surface to a temperature below said strain point, and directing the same fluid, when it has emerged from the open end of said article, against the outer surface of the article to chill said outer surface.

2. The method of tempering a bottle, jar or other hollow glass article that is closed at one end and open at the opposite end thereof, which comprises directing gaseous chilling fluid under pressure against the inner surface of said article when the latter is at a suitable tempering temperature above its strain point and thence out of the article through the open end thereof rapidly to chill said inner surface to a temperature below said strain point, and directing the same fluid, when it has emerged from the open end of said article, against the outer surface of the article in an annular stream moving longitudinally of the article from the open end thereof and completely enveloping said outer surface to chill it rapidly to a temperature below said strain point.

3. The method of tempering a bottle, jar or like hollow glass article that is open at only one end thereof, which comprises heating the article to a temperature sufficiently above the strain point of the glass thereof for the tempering operation, then circulating a gaseous chilling fluid under pressure from an external source through the interior of the article against the inner surface thereof and thence out of the article through the open end thereof to chill rapidly the inner surface of said article from said higher temperature to a temperature below said strain point, intercepting at least part of the fluid thus circulated on egress of such fluid from the open end of the article and directing the intercepted fluid longitudinally of the article along the outer surface thereof and at all points around said article rapidly to chill said outer surface in general correspondence with the chilling of the inner surface.

4. The method of tempering a bottle, jar or like hollow glass article that is open at only one end thereof which comprises blowing a gaseous chilling fluid against the inner surface of such an article, when such article is at a temperature substantially above its strain point, from a nozzle projecting into such article through the open end thereof and of sufficiently less diameter at the open end of said article than said open end to leave an annular fluid exhaust passage between the nozzle and the inner wall of the open end portion of said article, intercepting at least part of the fluid exhaust from the interior of said article at a plane adjacent to the open end of said article, and reversing the direction of movement of the intercepted fluid exhaust so as to direct such intercepted fluid longitudinally of the article along the outer surface thereof rapidly to chill such outer surface to a temperature below said strain point.

5. The method of tempering a bottle, jar or like hollow glass article that is open at only one end thereof which comprises blowing a gaseous chilling fluid against the inner surface of such an article, when such article is at a temperature substantially above its strain point, from a nozzle projecting into such article through the open end thereof and of sufficiently less diameter at the open end of said article than said open end to leave an annular fluid exhaust passage between the nozzle and the inner wall of the open end portion of said article, rotating said nozzle about its own axis to distribute the fluid blown therefrom around the inner periphery of the article, and intercepting the fluid exhaust from the open end of the article and directing at least part of the intercepted fluid longitudinally of the article in an annular stream completely surrounding and enveloping the outer surface of said article rapidly to chill said surface to a temperature below said strain point.

6. Apparatus for tempering a bottle, jar or other similar hollow glass article that is open only at one end thereof, comprising a gaseous fluid discharge nozzle of less diameter than the internal diameter of the open end of the article to be tempered, means for supporting said nozzle and said article so that the nozzle projects through the open end of the article in spaced relation therewith into the interior of said article, and a fluid exhaust intercepting and direction reversing member carried by said nozzle in spaced relation to the open end of said article and in the path of fluid exhaust from the article through the space between the nozzle and the inner wall of the open end portion of said article, said intercepting and direction reversing member being located wholly beyond the plane of said open end of said article.

7. Apparatus for tempering a bottle, jar or other similar hollow glass article that is open only at one end thereof, comprising a gaseous fluid discharge nozzle of less diameter than the internal diameter of the open end of the article to be tempered, means for supporting said nozzle and said article so that the nozzle projects through the open end of the article in spaced relation therewith into the interior of said article, and an annular member adjustably mounted on said nozzle in confronting relation to the open end of said article and at a predetermined variable distance therefrom, said member being formed at its surface next to the open end of said article to intercept fluid exhaust from said article and to direct the intercepted fluid exhaust longitudinally of said article along the outer surface thereof.

8. Apparatus for tempering a bottle, jar or other similar hollow glass article that is open only at one end thereof, comprising a gaseous fluid discharge nozzle of less diameter than the internal diameter of the open end of the article to be tempered, means for supporting said nozzle and said article so that the nozzle projects through the open end of the article in spaced relation therewith into the interior of said article, and an annular member adjustably mounted on said nozzle in confronting relation to the open end of said article wholly beyond the plane of said open end and at a predetermined variable distance therefrom, said member having a fluid directing lip at its periphery extending toward the open end of said article and of greater diameter than the diameter of the space for exhaust of fluid between said nozzle and the open end portion of said article.

9. Apparatus for tempering a bottle, jar or other similar hollow glass article that is open only at one end thereof, comprising a gaseous fluid discharge nozzle of less diameter than the internal diameter of the open end of the article to be tempered, means for supporting said nozzle and said article so that the nozzle projects through the open end of the article in spaced relation therewith into the interior of said article, and an annular member adjustably mounted on said nozzle in confronting relation to the open end of said article and at a predetermined variable distance therefrom, said member having the surface thereof next to the open end of said article concavely curved to intercept and change the direction of fluid exhaust from said article impinging thereagainst.

10. Apparatus for tempering a bottle, jar or other similar hollow glass article that is open only at one end thereof, comprising a gaseous fluid discharge nozzle of less diameter than the internal diameter of the open end of the article to be tempered, means for supporting said nozzle and said article so that the nozzle projects through the open end of the article in spaced relation therewith into the interior of said article, a fluid exhaust intercepting and direction reversing member carried by said nozzle in spaced relation to the open end of said article and in the path of fluid exhaust from the article through the space between the nozzle and the inner wall of the open end portion of said article, and a bottom fluid deflector located adjacent to the bottom of the article and in line therewith.

11. Apparatus for tempering a bottle, jar or other similar hollow glass article that is open only at one end thereof, comprising a gaseous fluid discharge nozzle of less diameter than the internal diameter of the open end of the article to be tempered, means for supporting said nozzle and said article so that the nozzle projects through the open end of the article in spaced relation therewith into the interior of said article, a fluid exhaust intercepting and direction reversing member carried by said nozzle in spaced relation to the open end of said article and in the path of fluid exhaust from the article through the space between the nozzle and the inner wall of the open end portion of said article, and an annular fluid confining and directing casing surrounding said article in spaced relation therewith.

12. In apparatus for tempering a bottle, jar or like article that is open only at one end thereof, a chilling fluid discharge nozzle of less diameter than the internal diameter of the article to be tempered, a fluid intercepting and direction reversing ring slidable on said nozzle, and means to fasten said ring to said nozzle in a predetermined position along the length of the latter to locate said ring in spaced confronting relation to the open end of said article when said nozzle projects through said open end to an operative fluid discharging postion in said article, said ring having one or more openings formed therethrough next to said nozzle, and valve means mounted on said ring for controlling said openings.

13. Apparatus for tempering a bottle, jar or like hollow glass article that is open only at one end thereof comprising means for directing gaseous fluid under pressure against the inner surface of such an article when said article is at a temperature substantially above its strain point and for exhausting said fluid through the open end of the article so as rapidly to chill said inner surface to a temperature below said strain point, and means for intercepting fluid exhaust from said open end of said article and for directing the intercepted fluid against the outer surface of the article to chill said outer surface rapidly to a temperature below said strain point in coordination with the chilling of said inner surface.

CHARLES E. MONGAN, JR.